United States Patent
Rao et al.

(10) Patent No.: US 12,200,116 B1
(45) Date of Patent: Jan. 14, 2025

(54) SYSTEMS AND METHODS FOR MEASURING ONE OR MORE METRICS OF A CRYPTOGRAPHIC ALGORITHM IN A POST-QUANTUM CRYPTOGRAPHY SYSTEM

(71) Applicant: Wells Fargo Bank, N.A., San Francisco, CA (US)

(72) Inventors: Abhijit Bhima Rao, Irvine, CA (US); Jeff J. Stapleton, O'Fallon, MO (US); Richard Wade Phillips, Charlotte, NC (US); Robert L. Carter, Jr., Pleasant Hill, IA (US); Palak J. Desai, Mountain House, CA (US); Naman A. Aggarwal, San Francisco, CA (US); Ramanathan Ramanathan, Bellevue, WA (US); Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 231 days.

(21) Appl. No.: 18/056,906

(22) Filed: Nov. 18, 2022

(51) Int. Cl.
*H04L 9/08* (2006.01)

(52) U.S. Cl.
CPC .................... *H04L 9/0852* (2013.01)

(58) Field of Classification Search
CPC ...................................................... H04L 9/0852
See application file for complete search history.

(56) References Cited

U.S. PATENT DOCUMENTS

| | | |
|---|---|---|
| 885,316 A | 4/1908 | Bernheim |
| 5,764,765 A | 6/1998 | Phoenix |

(Continued)

FOREIGN PATENT DOCUMENTS

| | | |
|---|---|---|
| CN | 101771619 A | 7/2010 |
| CN | 102663278 A | 9/2012 |

(Continued)

OTHER PUBLICATIONS

"Informative Report: Quantum Computing Risks to the Financial Services Industry," Accredited Standards Committee X9, Inc., ASC X9 IR Jan. 2019, 54 pages, (2019).

(Continued)

*Primary Examiner* — Techane Gergiso
(74) *Attorney, Agent, or Firm* — K&L Gates LLP

(57) ABSTRACT

Systems, apparatuses, and methods are disclosed for measuring one or more metrics of a cryptographic algorithm in a post-quantum cryptography (PQC) system. An example method includes obtaining a set of operating parameters comprising an algorithm of interest, wherein the algorithm of interest is a PQC algorithm, a legacy algorithm operating in a hybrid PQC system, or a variant thereof, and wherein the algorithm of interest is wrapped to present, via a wrapped algorithm of interest, a standardized interface to a sequence of benchmark operations. The example method further includes observing benchmark values of the one or more metrics, wherein the one or more metrics pertain to a designated benchmark operation from the sequence of benchmark operations. The example method further includes outputting a report comprising the benchmark values of the one or more metrics.

20 Claims, 5 Drawing Sheets

(56) References Cited

U.S. PATENT DOCUMENTS

| | | | |
|---|---|---|---|
| 5,915,025 A | 6/1999 | Taguchi | |
| 6,748,083 B2 | 6/2004 | Hughes | |
| 7,171,557 B2 | 1/2007 | Kallahalla | |
| 7,437,081 B2 | 10/2008 | Mitchell | |
| 7,778,976 B2 | 8/2010 | D'Souza | |
| 8,281,396 B2 | 10/2012 | Ali-Ahmad | |
| 8,484,694 B2 | 7/2013 | Diebler | |
| 8,490,188 B2 | 7/2013 | Kandek | |
| 8,539,586 B2 | 9/2013 | Stephenson | |
| 8,811,613 B2 | 8/2014 | Teruyama | |
| 8,925,093 B2 | 12/2014 | Ali-Ahmad | |
| 9,258,322 B2 | 2/2016 | Kandek | |
| 9,432,392 B2 | 8/2016 | Ali-Ahmad | |
| 9,591,027 B2 | 3/2017 | Molloy | |
| 9,613,099 B2 | 4/2017 | Molloy | |
| 9,614,668 B1 | 4/2017 | Simmons | |
| 9,621,594 B2 | 4/2017 | Kandek | |
| 9,621,694 B2 | 4/2017 | Wong | |
| 9,673,977 B1 | 6/2017 | Kalach | |
| 9,749,297 B2 | 8/2017 | Gvili | |
| 9,807,664 B1 | 10/2017 | Ray | |
| 9,876,813 B2 | 1/2018 | Harutyunyan | |
| 9,900,333 B2 | 2/2018 | Thakar | |
| 9,916,455 B2 | 3/2018 | Kandek | |
| 9,942,039 B1 | 4/2018 | Gutoski | |
| 9,960,465 B2 | 5/2018 | Dudley | |
| 10,003,457 B2 | 6/2018 | Hammon | |
| 10,015,187 B2 | 7/2018 | Ali-Ahmad | |
| 10,016,187 B2 | 7/2018 | Castro | |
| 10,021,140 B2 | 7/2018 | Molloy | |
| 10,057,058 B2 | 8/2018 | Murakami | |
| 10,089,489 B2 | 10/2018 | Goldfarb | |
| 10,104,101 B1 | 10/2018 | Thakar | |
| 10,108,801 B2 | 10/2018 | Shema | |
| 10,116,443 B1 | 10/2018 | Kalach | |
| 10,185,924 B1 | 1/2019 | McClintock | |
| 10,229,274 B2 | 3/2019 | Kandek | |
| 11,153,080 B1 | 10/2021 | Nix | |
| 11,240,014 B1 | 2/2022 | Maganti | |
| 11,322,050 B1 | 5/2022 | Arbajian | |
| 11,449,799 B1 | 9/2022 | Arbajian | |
| 11,477,016 B1 | 10/2022 | Carter, Jr. | |
| 2005/0138352 A1 | 6/2005 | Gauvreau | |
| 2007/0014415 A1 | 1/2007 | Harrison | |
| 2007/0046955 A1 | 3/2007 | Silverbrook | |
| 2007/0065154 A1 | 3/2007 | Luo | |
| 2007/0076884 A1 | 4/2007 | Wellbrock | |
| 2007/0143851 A1 | 6/2007 | Nicodemus | |
| 2007/0144851 A1 | 6/2007 | Ginja | |
| 2007/0195774 A1 | 8/2007 | Sherman | |
| 2007/0260658 A1 | 11/2007 | Fiorentino | |
| 2009/0228316 A1 | 9/2009 | Foley | |
| 2010/0043081 A1 | 2/2010 | Kiayias | |
| 2010/0175106 A1 | 7/2010 | Diebler | |
| 2010/0175134 A1 | 7/2010 | Ali-Ahmad | |
| 2010/0175135 A1 | 7/2010 | Kandek | |
| 2011/0206204 A1 | 8/2011 | Sychev | |
| 2011/0213979 A1 | 9/2011 | Wiseman | |
| 2012/0158725 A1 | 6/2012 | Molloy | |
| 2012/0233700 A1 | 9/2012 | Ali-Ahmad | |
| 2013/0263206 A1 | 10/2013 | Nefedov | |
| 2014/0010234 A1 | 1/2014 | Patel | |
| 2014/0068765 A1 | 3/2014 | Choi | |
| 2014/0109169 A1 | 4/2014 | Kandek | |
| 2014/0133652 A1 | 5/2014 | Oshida | |
| 2014/0137228 A1 | 5/2014 | Shema | |
| 2014/0268245 A1 | 9/2014 | Kawach | |
| 2015/0106950 A1 | 4/2015 | Holman | |
| 2015/0222765 A9 | 8/2015 | Kawach | |
| 2016/0234009 A1 | 8/2016 | Li | |
| 2016/0241396 A1 | 8/2016 | Fu | |
| 2016/0330219 A1 | 11/2016 | Hasan | |
| 2016/0349626 A1 | 12/2016 | Matsumoto | |
| 2016/0359626 A1 | 12/2016 | Fu | |
| 2016/0366094 A1 | 12/2016 | Mason | |
| 2017/0104590 A1 | 4/2017 | Wang | |
| 2017/0155628 A1 | 6/2017 | Rohloff | |
| 2017/0173262 A1 | 6/2017 | Veltz | |
| 2017/0214525 A1 | 7/2017 | Zhao | |
| 2017/0230173 A1 | 8/2017 | Choi | |
| 2017/0250796 A1 | 8/2017 | Samid | |
| 2017/0324554 A1 | 11/2017 | Tomlinson | |
| 2017/0346627 A1 | 11/2017 | Alleaume | |
| 2017/0353302 A1 | 12/2017 | Fernandez | |
| 2018/0034804 A1 | 2/2018 | Steiner | |
| 2018/0046766 A1 | 2/2018 | Deonarine | |
| 2018/0146004 A1 | 5/2018 | Belfiore, Jr. | |
| 2018/0176015 A1 | 6/2018 | Wang | |
| 2018/0176091 A1 | 6/2018 | Yoon | |
| 2018/0295114 A1 | 10/2018 | Abdalla | |
| 2018/0316492 A1 | 11/2018 | Ramachandran | |
| 2018/0316694 A1 | 11/2018 | Thakar | |
| 2018/0337899 A1 | 11/2018 | Becker | |
| 2018/0357934 A1 | 12/2018 | Smith | |
| 2019/0014126 A1 | 1/2019 | Sherkin | |
| 2019/0036821 A1 | 1/2019 | Levy | |
| 2019/0166128 A1 | 5/2019 | Kurian | |
| 2019/0233060 A1 | 8/2019 | Moffat | |
| 2019/0295050 A1 | 9/2019 | Chalkias | |
| 2019/0305955 A1 | 10/2019 | Verma | |
| 2019/0319804 A1* | 10/2019 | Mathew | G09C 1/00 |
| 2019/0325166 A1* | 10/2019 | Suresh | G06F 21/76 |
| 2019/0349392 A1 | 11/2019 | Wetterwald | |
| 2020/0084030 A1 | 3/2020 | Nendell | |
| 2020/0084222 A1 | 3/2020 | William | |
| 2020/0106606 A1 | 4/2020 | Pontaza Rodas | |
| 2020/0184017 A1 | 6/2020 | Batra | |
| 2020/0259647 A1* | 8/2020 | Goncalves | H04L 9/14 |
| 2020/0320080 A1 | 10/2020 | Almasan | |
| 2020/0320340 A1 | 10/2020 | Wentz | |
| 2020/0320543 A1 | 10/2020 | Carter | |
| 2020/0328886 A1 | 10/2020 | Newton | |
| 2020/0402073 A1 | 12/2020 | Tang | |
| 2021/0034349 A1 | 2/2021 | Hatakeyama | |
| 2021/0042158 A1 | 2/2021 | Proud | |
| 2021/0273792 A1 | 9/2021 | Coady | |
| 2021/0306144 A1 | 9/2021 | Chen | |
| 2021/0306145 A1* | 9/2021 | Krauthamer | H04L 63/0428 |
| 2021/0377049 A1* | 12/2021 | Nix | H04L 9/0877 |
| 2021/0401637 A1 | 12/2021 | Tally | |
| 2022/0006835 A1* | 1/2022 | Gray | H04L 9/085 |
| 2022/0158855 A1 | 5/2022 | Wentz | |
| 2022/0294611 A1* | 9/2022 | Katsumata | H04L 63/061 |
| 2023/0318829 A1* | 10/2023 | Sim | H04L 9/0852 |
| 2024/0121615 A1* | 4/2024 | Friesen | H04L 9/14 |

FOREIGN PATENT DOCUMENTS

| | | |
|---|---|---|
| CN | 103095461 A | 5/2013 |
| CN | 106803784 A | 6/2017 |
| CN | 106921674 A | 7/2017 |
| CN | 107292168 A | 10/2017 |
| CN | 108092771 A | 5/2018 |
| CN | 108111301 A | 6/2018 |
| CN | 109150835 A | 1/2019 |
| CN | 112235112 A | 1/2021 |
| EP | 3373505 A1 | 9/2018 |
| WO | 2015078533 A1 | 6/2015 |
| WO | 2018031940 A1 | 2/2018 |
| WO | 2018177905 A1 | 10/2018 |

OTHER PUBLICATIONS

"Quantum Techniques in Cryptographic Message Syntax (CMS)", Accredited Standards Committee X9, Inc., ASC X9 TR 50-2019, 42 pages, (2019).

Alkim et al., "Post-quantum Key Exchange—A New Hope," USENIX, 25th USENIX Security Symposium, Aug. 10-12, 2016, (Austin, TX, US), pp. 327-343, (2016).

Barker, "Recommendation for Key Management, Part 1: General", NIST Special Publication 800-57 Pt 1., Rev. 4, National Institute of Standards and Technology, 160 pages, (2016).

(56) References Cited

OTHER PUBLICATIONS

Cordova et al., "Comparative analysis on the performance of selected security algorithms in cloud computing," 2017 International Conference on Electrical and Computing Technologies and Applications (ICECTA), pp. 1-4 (2017).

De Feo et al., "Towards Quantum-Resistant Cryptosystems from Supersingular Elliptic Curve Isogenies," International Workshop on Post-Quantum Cryptography, Springer, Berlin, Heidelberg, 24 pages, (2011).

Erickson et al., "Quantum Information Systems: The State of Post-Quantum Cryptography as a Means to Combat Shos Algorithm Run on a Scalable Quantum Computer," 15 pages (2018).

Facon et al., "Detecting cache-timing vulnerabilities in post-quantum cryptography algorithms," 3rd International Verification and Security Workshop (IVSW), IEEE, p. 7-12, (2018).

Farik et al., "The Need for Quantum-Resistant Cryptography in Classical Computers", 2016 3rd Asia-Pacific World Congress on Computer Science and Engineering (APWC on CSE), pp. 98-105 (2016).

Feng et al., "Big Data Adaptive Encryption Technology for Remote Network Storage," 2020 IEEE 3rd International Conference of Safe Production and Informatization (IICSPI), pp. 709-712 (2020).

Gorbenko et al., "Examining A Possibility to Use and the Benefits of Post-Quantum Algorithms Dependent on the Conditions of their Application," Eastern-European Journal of Enterprise Technologies, ISSN 1729-3774: 21-32, (2017).

Kindberg, Marcus, "A usability study of post-quantum algorithms", Mastes Thesis, Department of Electrical and Information Technology, Jun. 13, 2017, 68 pages.

Lauterbach et al., "Performance Analysis of Post-Quantum Algorithms," 2021 29th Telecommunications Forum (TELFOR), Nov. 23-24, 2021, 4 pages.

Liu et al., "Securing Edge Devices in the Post-Quantum Internet of Things Using Lattice-Based Cryptography", IEEE Communications Magazine, vol. 56, No. 2, Feb. 2018, pp. 158-162.

Louridas et al., "Privacy-Enhancing Cryptography in Distributed Ledgers," DS-Jun. 2017: Cybersecurity PPP: Cryptography, PRIViLEDGE, 27 pages, (2018).

Moody et al., "Securing Tomorrows Information Through Post-Quantum Cryptography," ITL Bulletin, Information Technology Laboratory, 4 pages, (2018).

Nejatollahi H, Dutt N, Ray S, Regazzoni F, Banerjee I, Cammarota R. Post-quantum lattice-based cryptography implementations: A survey. ACM Computing Surveys (CSUR). Jan. 2, 20198;51(6):1-41. (Year: 2019).

Ott et al., "Identifying research challenges in post quantum cryptography migration and cryptographic agility", Computing Community Consortium, Jan. 31, 2019, 30 pages.

Pugh et al., "Systematic Testing of Post-Quantum Cryptographic Implementations Using Metamorphic Testing", 20H IEEE/ACM 4th International Workshop on Metamorphic Testing (MET), 7 pages (2019).

Ribeiro et al., "Why Should I Trust You Explaining the Predictions of Any Classifier," KOO, San Francisco, CA, USA, 10 pages, (2016).

Taha et al., "Implementation Attacks on Post-Quantum Cryptographic Schemes," IACR Cryptology ePrint Archive, 14 pages (2015).

Vambol et al., "McEliece and Niederreiter Cryptosystems Analysis in the Context of Post-Quantum Network Security", 2017 Fourth International Conference on Mathematics and Computers in Sciences and in Industry (MCSI), pp. 134-137 (2017).

Zhao et al., "Providing adaptive quality of security in quantum networks," Robustness 2015 (QSHINE), 11th 2015, International pp. 440-445. Conference on Heterogenous Networking for Quality, Reliability, Security and Robustness (QSHINE), pp. 440-445 (2015).

Grote et al., "A Review of Post-quantum Cryptography and Crypto-agility Strategies", 2019 International Interdisciplinary PhD Workshop (IIPhDW), 2019, pp. 115-120.

Kabanov et al., "Practical cryptographic strategies in the post-quantum era", AIP Conference Proceedings, vol. 1936, No. 1, AIP Publishing LLC, 2018, 6 pages.

Zeydan et al., "Recent Advances in Post-Quantum Cryptography for Networks: A Survey", 2022 Seventh International Conference on Mobile and Secure Services (MobiSecServ), 2022, pp. 1-8.

U.S. Appl. No. 18/171,956, filed Feb. 21, 2023.

Matthias J. Kannwischer, et al., Testing and Benchmarking NIST PQC on ARM Cortex-M4, Radboud Universit, Nijmegen, The Netherlands, Jul. 21, 2019.

Alexander Wiesmaier, et al., On PQC Migration and Crypto-Agility.

Viet Ba Dang, et al., Cryptographic Engineering Research Group, George Mason University, Implementation and Benchmarking of Round 2 Candidates in the NIST Post-Quantum Cryptography Standardization Process Using Hardware and Software/Hardware Co-design Approaches, p. 1. 86.

Chujiao Ma, et al., Crypto Agility Risk Assessment Framework, Journal of Cybersecurity, pp. 1-11, 2001.

* cited by examiner

SYSTEMS AND METHODS FOR MEASURING ONE OR MORE METRICS OF A CRYPTOGRAPHIC ALGORITHM IN A POST-QUANTUM CRYPTOGRAPHY SYSTEM

BACKGROUND

The inevitable emergence of quantum computing represents a significant disruption to commonly used cryptographic methods. This has led to the development of post-quantum cryptography (PQC) algorithms, which are designed to be safe against a potential attacker with a quantum computer. However, the number of PQC algorithms needed to maintain a secure system is far greater and the methods less established than in legacy asymmetric cryptography, making it challenging to migrate systems to PQC.

BRIEF SUMMARY

Although still in its infancy, quantum computing and its potential applications are of rapidly increasing interest to a broad array of industrial sectors, including simulation, artificial intelligence, healthcare, and financial services. Unlike classical computers, which process information in bits that can only represent one of two binary information states at a time, quantum computers process information in quantum bits (qubits) that can be in a superposition of all possible states at the same time. Further, two or more qubits may be entangled such that their quantum state cannot be described independently of each other, thus when two qubits are entangled the outcome of measurement a of one qubit is always correlated with the measurement on the other qubit, even when the qubits are separated by large distances. Quantum computers may simultaneously perform a vast number of operations on the information stored in superposition. When measured, a qubit's probability to collapse into one state or the other is determined by the quantum phenomenon referred to as interference. Superposition, entanglement, and interference are three phenomena in quantum mechanics that allow quantum computers to perform incredibly complex calculations at speeds not realizable today and solve certain classes of problems that are beyond the capability of existing classical computers.

Reflecting this broad potential impact, governments and companies from a variety of market sectors are investing substantial resources to develop today's so-called "noisy intermediate scale quantum" (NISQ) devices into stable quantum computers. These NISQ devices are subject to rapid quantum decoherence, and lack the quantum volume to compete with present-day classical computers.

Nonetheless, continuing at the current pace of development, quantum computers of the near future will disrupt current asymmetric algorithms and security protocols (e.g. TLS) that protect global financial markets and governmental institutions. For example, most common public-key cryptography schemes, such as the widely-used Rivest-Shamir-Adleman (RSA), Diffie-Hellman (DH), and elliptic-curve Diffie-Hellman (ECDH) schemes, rely on the inability of classical computers to complete certain types of complex mathematical calculations, such as integer factorization and discrete logarithm computation, respectively, within a feasible amount of time. A quantum computer implementing Shor's algorithm will complete these complex calculations in a relatively short time and thereby determine the private keys from the corresponding public keys. Accordingly, there is an urgent need for data owners and hosting services to begin upgrading their systems to use quantum-resistant algorithms, known as post quantum cryptography (PQC) algorithms, before large coherent fault-tolerant quantum computing capabilities are realized. However, the sheer volume of this data, the complexity of these systems, and further emergent difficulties with implementation present myriad challenges to any such migration plan.

Systems, apparatuses, methods, and computer program products are disclosed herein for measuring one or more metrics of a cryptographic algorithm in a PQC system. Embodiments disclosed herein enable the upgrading of information security infrastructure to protect against a potential quantum computer attack by providing benchmark data characterizing various PQC systems in production, pre-production, and/or post-production.

In one example embodiment, a method is provided for measuring one or more metrics of a cryptographic algorithm in a PQC system. The method includes obtaining, via communications hardware, a set of operating parameters comprising an algorithm of interest, where the algorithm of interest is a PQC algorithm, a legacy algorithm operating in a hybrid PQC cryptography system, or a variant thereof, and where the algorithm of interest is wrapped to present, via a wrapped algorithm of interest, a standardized interface to a sequence of benchmark operations. The method further includes observing, via benchmarking circuitry, benchmark values of the one or more metrics, where the one or more metrics pertain to a designated benchmark operation from the sequence of benchmark operations, and where the one or more metrics comprise a first duration of time taken to execute the designated benchmark operation, a second duration of time taken to execute a subprocess of the designated benchmark operation, volatile storage usage due to the execution of the designated benchmark operation, non-volatile storage usage due to the execution of the designated benchmark operation, processor usage due to the execution of the designated benchmark operation, or a quantity derived from one or more of the above. The method additionally includes outputting, via the communications hardware, a report comprising the benchmark values of the one or more metrics.

In another example embodiment, an apparatus is provided for measuring one or more metrics of a cryptographic algorithm in a PQC system. The apparatus includes communications hardware configured to obtain a set of operating parameters comprising an algorithm of interest, where the algorithm of interest is a PQC algorithm, a legacy algorithm operating in a hybrid PQC system, or a variant thereof, and where the algorithm of interest is wrapped to present, via a wrapped algorithm of interest, a standardized interface to a sequence of benchmark operations. The apparatus further includes benchmarking circuitry configured to observe benchmark values of the one or more metrics, where the one or more metrics pertain to a designated benchmark operation from the sequence of benchmark operations, and where the one or more metrics comprise a first duration of time taken to execute the designated benchmark operation, a second duration of time taken to execute a subprocess of the designated benchmark operation, volatile storage usage due to the execution of the designated benchmark operation, non-volatile storage usage due to the execution of the designated benchmark operation, processor usage due to the execution of the designated benchmark operation, or a quantity derived from one or more of the above. The apparatus additionally has communications hardware further configured to output a report comprising the benchmark values of the one or more metrics.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
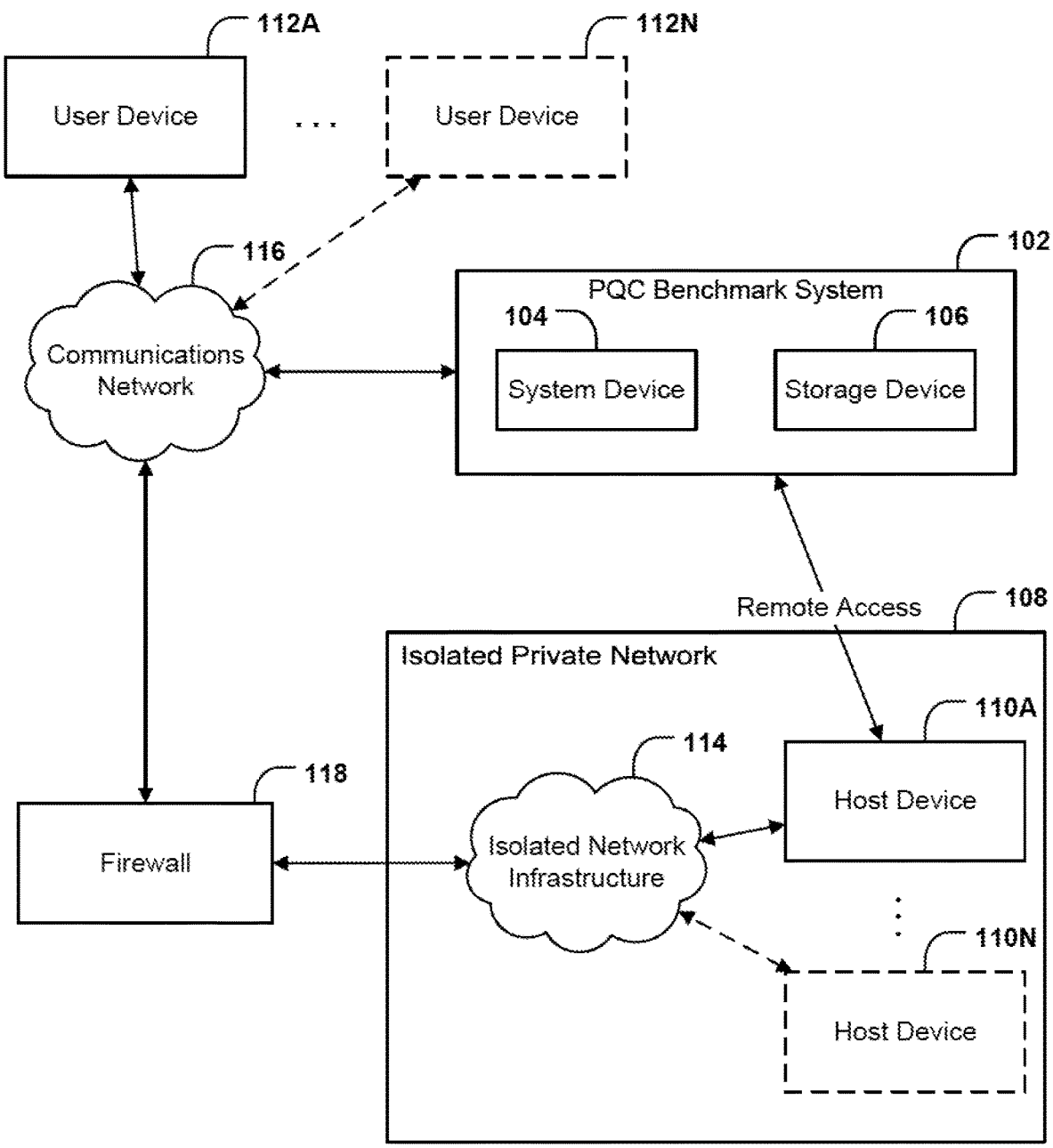
FIG. 1 illustrates a system in which some example embodiments may be used to measure one or more metrics of a cryptographic algorithm in a PQC system, in accordance with some example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server maybe a hardware security module ("HSM") or a security appliance. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "key establishment" is used to refer to operations, protocols, algorithms, or the like such as DH key exchange, ECDH key exchange, variants of DH such as authenticated DH, and other key exchange or key agreement methods. Key establishment schemes may also include key encapsulation mechanisms (KEM) for transmission of symmetric keys using asymmetric key encryption, such as RSA. Key establishment schemes may also include or make use of public key infrastructure or make use of a decentralized model of public key trust.

The term "post-quantum cryptography (PQC) system" refers to cryptosystems which are designed to be resistant to quantum attacks. PQC systems may make use of specifically designed algorithms that are resistant to quantum attacks (PQC algorithms, defined below), or may be resistant to quantum attack due to a particular implementation of legacy algorithms (for example, implementing a doubled AES key length). The related term "cryptographic transition" refers to the updating from one system security architecture to another. In some embodiments, cryptographic transition includes migration of legacy cryptographic systems to PQC systems.

The term "PQC algorithm" refers to a quantum-resistant cryptographic technique. The families of PQC cryptographic techniques include public-key encryption/key establishment algorithms and digital signature algorithms. PQC algorithms may comprise, for example, hash-based PQC cryptographic techniques, lattice-based PQC cryptographic techniques, isogeny-based PQC cryptographic techniques, code-based PQC cryptographic techniques, multivariate-based PQC cryptographic techniques, zero-knowledge proof PQC cryptographic techniques, PQC communications channel-based cryptographic techniques, and other suitable techniques. In some instances, a PQC cryptographic technique may be a variant of a PQC cryptographic algorithm. For example, a first PQC cryptographic technique may be CRYSTALS-DILITHIUM2, a second PQC cryptographic technique may be CRYSTALS-DILITHIUM3, and a third PQC cryptographic technique may be CRYSTALS-DILITHIUM5, each of which is a different variant of the same PQC cryptographic algorithm (e.g., CRYSTALS-DILITHIUM). In some usage, the term PQC algorithm may refer to the set of cryptographic algorithms officially selected and recommended by the National Institute of Standards and Technology (NIST) as part of the NIST Post-Quantum Cryptography Standardization Process.

Hash-based PQC cryptographic techniques (e.g., hash-based PQC cryptographic signatures) are suitable for one-time use, wherein a tuning parameter provides a trade-off between signature size and key generation, signing, and verification speed, and can be can be used with any secure hashing function. Hash-based PQC cryptographic techniques may be used to provide digital signatures, such as SPHINCS+.

Lattice-based PQC cryptographic techniques are based on the shortest vector problem, the leading replacement for prime factorization and discrete logarithm, and typically are less computationally resource intensive in relation to isogeny-based and other PQC cryptographic techniques. In some instances, lattice-based PQC cryptographic techniques may be used to provide digital signatures, such as CRYSTALS-DILITHIUM. In some instances, lattice-based PQC cryptographic techniques may be used to provide key exchange by key encapsulation, such as NewHope, Frodo Key-Encapsulation Mechanisms (FrodoKEM), Nth degree-Truncated polynomial Ring Units (NTRU) Prime, and CRYSTALS-KYBER. In some instances, lattice-based PQC cryptographic techniques may be used to provide key exchange by key agreement, such as NewHope Classic, Frodo Diffie-Hellman (FrodoDH), and Ring Learning With Errors Key Exchange (RLWE-KEX).

Isogeny-based PQC cryptographic techniques use very small keys and typically are more computationally resource intensive in relation to lattice-based and other PQC cryptographic techniques. In some instances, isogeny-based PQC cryptographic techniques may be used to provide key exchange by key encapsulation, such as Supersingular Isogeny Key Encapsulation (SIKE). In some instances, isogeny-based PQC cryptographic techniques may be used to provide key exchange by key agreement, such as Supersingular isogeny Diffie-Hellman (SIDH) key exchange.

Code-based PQC cryptographic techniques use very large key sizes yet are typically the fastest PQC cryptographic techniques at the comparable security level (e.g., extremely fast in encryption and reasonably fast in decryption). In some instances, code-based PQC cryptographic techniques may be used to provide key exchange by key encapsulation, such as Classic McElicce, McEliece Quasi-Cyclic Moderate Density Parity Check (QC-MDPC), and Bit Flipping Key Encapsulation (BIKE).

Multivariate-based PQC cryptographic techniques use small public keys and fast verification yet, in some instances, are less efficient than other PQC cryptographic techniques. Multivariate-based PQC cryptographic techniques may be used to provide digital signatures, such as Rainbow.

Zero-knowledge proof PQC cryptographic techniques use very small key pairs and derive their security entirely from the security of symmetric-key primitives and are believed to be quantum-secure. In some instances, zero-knowledge proof PQC cryptographic techniques may be used to provide digital signatures, such as Picnic.

The term "legacy cryptography system" refers to cryptosystems which utilize legacy cryptographic techniques, or cryptographic techniques that are not quantum-resistant or non-PQC. Legacy cryptographic techniques may comprise, for example, RSA, DH, and other such legacy cryptographic algorithms. In some instances, a legacy cryptographic technique may be a variant of a legacy cryptographic algorithm. For example, a first legacy cryptographic technique may be RSA-2048, a second legacy cryptographic technique may be RSA-3072, and a third legacy cryptographic technique may be RSA-4096, each of which is a different variant of the same legacy cryptographic algorithm (e.g., RSA). In another example, a first legacy cryptographic technique may be AES-128, and a second legacy cryptographic technique may be DH-2048, each of which is a variant of a different legacy cryptographic algorithm (e.g., AES, DH). In yet another example, a first legacy cryptographic technique may encrypt overhead data based on RSA-2048 and transmit the encrypted data over a legacy communications channel (e.g., an in-band communications channel), and a second legacy cryptographic technique may transmit overhead data over a legacy communications channel as clear text, each of which is a different variant of a legacy communications channel-based cryptographic technique.

The term "hybrid PQC cryptographic technique" refers to a cryptographic technique that comprises a legacy cryptographic algorithm and a PQC algorithm. A cryptographic system utilizing hybrid PQC cryptographic techniques may be referred to as a hybrid PQC system or hybrid PQC cryptosystem. In some examples, a legacy cryptographic algorithm and a PQC algorithm may be combined to form a single hybrid PQC algorithm.

OVERVIEW

As noted above, methods, apparatuses, systems, and computer program products are described herein that provide for measuring one or more metrics of a cryptographic algorithm in a PQC system. Traditionally, data owners and third-party hosting services use legacy cryptosystems to safeguard the confidentiality, integrity, and authenticity of enormous volumes of protected data and complex IT systems. These cryptosystems typically use a combination of asymmetric cryptography (e.g., public key cryptography), such as the Rivest-Shamir-Adleman (RSA) cryptosystem, and symmetric cryptography (e.g., secret key cryptography), such as the Advanced Encryption Standard (AES). One example of a modern legacy cryptosystem is the Transport Layer Security (TLS) protocol, which relies on asymmetric cryptography for authentication and key management to establish session keys, and symmetric cryptography for session encryption and integrity validation.

However, these cryptosystems are vulnerable to quantum algorithms implemented on quantum computers. For instance, asymmetric encryption, key exchange, and digital signature rely on mathematical problems such as the integer factorization problem (e.g., as used in RSA) and the discrete logarithm problem (e.g., as used in Digital Signature Algorithm (DSA), Elliptic Curve DSA (ECDSA), Diffie-Hellman (DH), and Elliptic Curve DH (ECDH)). It is widely believed that a large-scale fault tolerant quantum computer could effectively break modern public key cryptosystems by solving instances of the integer factorization problem and the discrete logarithm problem quickly enough that keys reverse engineered based on those solutions would still be valid.

In one illustrative example, a quantum computer used for cryptanalysis implementing Shor's algorithm could determine the private keys used for current public-key systems in a relatively short time because Shor's algorithm provides a faster cryptanalysis method for solving integer factorization than a brute force method (e.g., guessing prime numbers). For instance, Shor's algorithm uses the quantum Fourier transform (QFT) instead of its slower classical counterpart, the fast Fourier transform (FFT). Further, Shor's algorithm can be modified to compute discrete logarithms, including discrete logarithms used for elliptic-curve cryptography (ECC).

Although quantum computers capable of such feats are still believed to be several years away, the threat of a "harvest now and decrypt later attack" makes quantum computing an immediate real threat, even if the threat will not be actionable until a sufficiently stable quantum computer is developed in the future. The "harvest now and decrypt later attack" is a long-game attack where a bad actor records and stores protected information, such as data streaming through the Internet or cloud, by the way of breaches or passive interception and then hoard the encrypted data, waiting for the day when quantum computers can provide the means to decrypt the protected information. In some examples, an attacker may record a complete security protocol (e.g. TLS) and use the sufficiently advanced quantum computer to derive a private key from the public key, then replay the protocol to derive the session keys, then decrypt the hoarded data.

Given that data is a highly valuable asset, especially in the financial industry, there is an urgent need for data owners and hosting services to initiate the process of protecting their valuable customer information and digital assets even before quantum computing capabilities are realized. Bank data has long shelf life, e.g., home loan data is stored for the life of the loan which may be 30 years. This process primarily involves migrating data and systems to algorithms that are thought to be quantum-resistant. In an attempt to promulgate quantum-resistant algorithms, the National Institute of Standards and Technology (NIST), a federal agency within the U.S. Department of Commerce, has initiated the NIST Post-Quantum Cryptography Standardization Process to solicit, evaluate, and standardize one or more quantum-resistant public-key cryptographic algorithms. At present, there are many different candidate cryptographic algorithms believed to be quantum-resistant. However, because the standardization process is not yet complete, migration of legacy cryptosystems to any one of NIST's candidate cryptographic algorithms could later compound the computational and resource burden on data owners and hosting services if NIST does not select that particular cryptographic algorithm as the standard or makes changes to the proposed cryptographic algorithms.

Although some quantum-resistant cryptographic algorithms are available today, those algorithms may not be the algorithm, or a variant of the algorithm, that eventually is approved as part of the NIST Post-Quantum Cryptography Standardization Process. Moreover, the adoption of these algorithms will, in some instances, be an overly complex and time-consuming process. First, this migration process is challenging due to the sheer volume of data consumed by these systems, as well as the general complexity of the systems. For example, financial services providers and their partners each may have data for millions of customers and trillions of transactions stored in various databases. In addition, these providers are processing millions of transactions on a daily basis and adding new customer data to their systems. Second, data is stored in more places than ever before and must be encrypted using different cryptographic keys depending upon whether the data is going to be protected while in transit, while at rest in-cloud, or while at rest on-premises. Governmental regulations, NIST recommendations, and industry standards and best practices will, in some instances, drive the cryptographic techniques that are used to encrypt the data. Third, many organizations use several types of encryption, hashing, and other cryptographic algorithms with varying security architecture depending on the needs of the data owner or hosting service. Fourth, there is the need to protect data for varying durations to manage legal and regulatory risk, sometimes as long as twenty to thirty years, and even in some cases for over fifty years. Fifth, the deployment of fundamental changes to infrastructure might take a decade or more, and there is very little tolerance for incurring risk while deploying changes. All of these considerations introduce additional levels of complexity, and thus data owners and hosting services must methodically migrate their cryptographic infrastructure to quantum-resistant cryptography. In addition, the cryptography transition is challenging because it is not restricted only to algorithms and key lengths. Rather, the cryptography transition is impacted by several other details of security infrastructure, such as interoperability, integration with existing systems and security architectures, scalability, compliance and regulatory requirements, maintenance, and backward compatibility requirements.

Accordingly, the present disclosure sets forth systems, methods, and apparatuses that measure one or more metrics of a cryptographic algorithm in a PQC system. There are many advantages of these and other embodiments described herein. For instance, benchmarks may be used by an organization to make informed decisions concerning a migration from legacy cryptography to PQC. System administrators with data pertaining to the performance of PQC algorithms in their exact applications and environments will be able to choose the most appropriate PQC algorithms, without resorting to generalized data that may not take into account the specifics of the system. In addition, embodiments described herein enable the continuous operation of network-connected devices by allowing for rapid testing and implementation of updates to PQC algorithms. Drop-in implementation of variants and new updates to PQC algorithms reduce downtime needed for updates and testing of new security updates, enhancing the cryptographic agility of devices. In a preferred embodiment, the benchmark data may help discern between two vendors or libraries that implement the same PQC algorithm. For example, a vendor may have an implementation of the PQC algorithm CRYSTALS-DILITHIUM 2, and an open-source software implementation of the same algorithm may exist. Analyzing the benchmarks of the vendor and open-source software implementations will determine if the performance of the vendor implementation offers advantages over the open-source alternative, and will help an organization analyze the costs and benefits of either choice. Finally, automated generation of benchmark data enables fine-grained control and automation of the process of selecting PQC algorithms. With the ability to score and quantitatively rank PQC algorithms in different environments, decisions may be made more rapidly about which tools to deploy, reducing the need for error-prone human intervention.

System Architecture

Example embodiments described herein may be implemented using any of a variety of computing devices or servers. To this end, FIG. 1 illustrates an example environment within which various embodiments may operate. As illustrated, a PQC benchmark system 102 may include a system device 104 in communication with a storage device 106. Although system device 104 and storage device 106 are described in singular form, some embodiments may utilize more than one system device 104 and/or more than one storage device 106.

Additionally, some embodiments of the PQC benchmark system 102 may not require a storage device 106 at all. Whatever the implementation, the PQC benchmark system 102, and its constituent system device 104 and/or storage device 106 may receive and/or transmit information via communications network 116 (e.g., the Internet) with any number of other devices, such as one or more of host device 110A through host device 110N located within an isolated private network 108 by way of firewall 118, and/or user device 112A through user device 112N.

The isolated private network 108 may comprise private isolated network infrastructure 114 and one or more host device 110A through host device 110N. The isolated private network 108 may utilize a firewall 118 to protect from outside network traffic, for example from communications network 116. The isolated private network 108 may be configured for testing and benchmarking of various networking or cryptographic functions. The PQC benchmark system 102 may have direct access to one or more host device 110A through host device 110N for the purpose of conducting benchmark tests, or the PQC benchmark system 102 may be physically proximate to a host device 110, or may be embodied as circuitry integrated into a host device 110. In the case when the PQC benchmark system 102 is situated outside of isolated private network 108, a remote access protocol, such as secure shell (SSH) or the like may be used to directly access one or more host device 110A through host device 110N.

The system device 104 may be implemented as one or more servers, which may or may not be physically proximate to other components of the PQC benchmark system 102. Furthermore, some components of system device 104 may be physically proximate to the other components of the PQC benchmark system 102 while other components are not. The system device 104 may receive, process, generate, and transmit data, signals, and electronic information to facilitate the operations of the PQC benchmark system 102. Particular components of system device 104 are described in greater detail below with reference to apparatus 200 in connection with FIG. 2.

The storage device 106 may comprise a distinct component from system device 104, or may comprise an element of system device 104 (e.g., memory 204, as described below in connection with FIG. 2). The storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications hardware 206). The storage device 106 may host the software executed to operate the PQC benchmark system 102. The storage device 106 may store information relied upon during operation of the PQC benchmark system 102, such as various cryptographic libraries that may be used by the PQC benchmark system 102, data and documents to be analyzed using the PQC benchmark system 102, or the like. In addition, the storage device 106 may store control signals, device characteristics, and access credentials enabling interaction between the PQC benchmark system 102 and one or more of the host device 110A-110N or user device 112A-112N.

The one or more host device 110A-110N may be embodied by any computing devices and/or server devices known in the art. Similarly, the one or more user device 112A-112N may be embodied by any computing devices known in the art, such as desktop or laptop computers, tablet devices, smartphones, or the like. The one or more host device 110A-110N and the one or more user device 112A-112 user device 112N need not themselves be independent devices, but may be peripheral devices communicatively coupled to other computing devices. The one or more host device 110A-110N may be embodied by a wide variety of devices for security benchmarking and/or testing purposes. For example, the one or more host device 110A-110N may be embodied by virtual machines, cloud platforms, embedded systems, a resource-constrained internet-of-things (IoT) device, or the like.

Although FIG. 1 illustrates an environment and implementation in which the PQC benchmark system 102 interacts with one or more of host device 110A through host device 110N and/or user device 112A through user device 112N, in some embodiments users may directly interact with the PQC benchmark system 102 (e.g., via communications hardware 206 of system device 104), in which case a separate user device may not be utilized. Whether by way of direct interaction or via a separate user device, a user may communicate with, operate, control, modify, or otherwise interact with the PQC benchmark system 102 to perform the various functions and achieve the various benefits described herein.

Example Implementing Apparatuses

Figure 2:
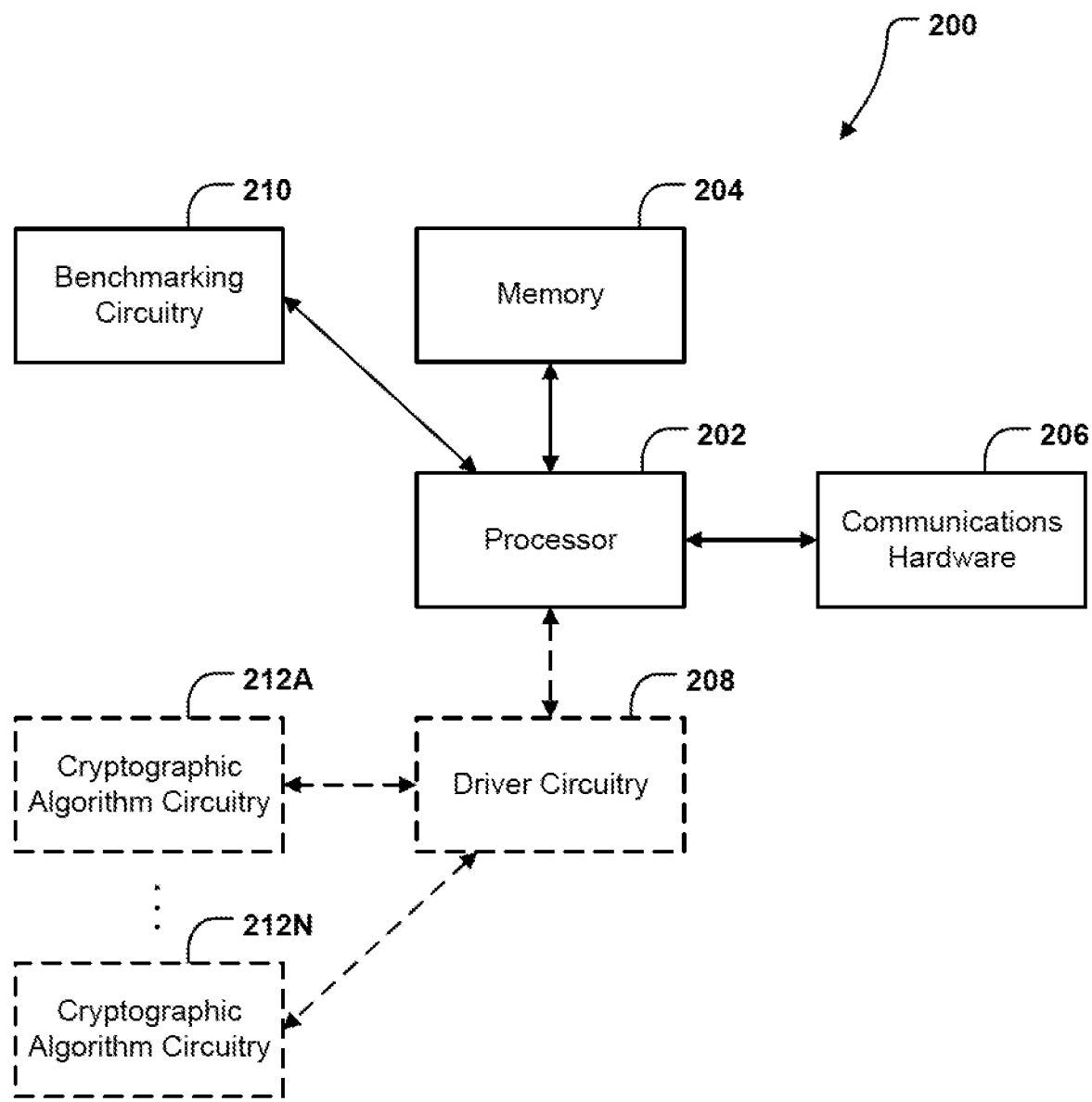
FIG. 2 illustrates a schematic block diagram of example circuitry embodying a device that may perform various operations in accordance with some example embodiments described herein.

The system device 104 of the PQC benchmark system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, driver circuitry 208, benchmarking circuitry 210, and one or more cryptographic algorithm circuitry 212A-212N, each of which will be described in greater detail below. While the various components 204-210 are only illustrated in FIG. 2 as being connected with processor 202, it will be understood that the apparatus 200 may further comprise a bus (not expressly shown in FIG. 2) for passing information amongst any combination of the various components of the apparatus 200. Likewise, while each cryptographic algorithm circuitry 212A-212N is illustrated in FIG. 2 as being connected only with driver circuitry 208, it may pass information to or from any of the various components of the apparatus 200 via the bus. The apparatus 200 may be configured to execute various operations described above in connection with FIG. 1 and below in connection with FIGS. 3-4.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

The memory 204 is non-transitory and may include, for example, one or more volatile and/or non-volatile memories.

In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may be configured to provide output to a user and, in some embodiments, to receive an indication of user input. It will be noted that some embodiments will not include such configurations, in which case user input may be received via a separate device such as a user device 112A-112N (shown in FIG. 1). The communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 may further comprise a driver circuitry 208 that causes execution of various operations of cryptographic algorithms. The driver circuitry 208 may utilize processor 202, memory 204, or any other hardware component included in the apparatus 200 to perform these operations, as described in connection with FIGS. 3-4 below. The driver circuitry 208 may further utilize communications hardware 206 to gather data from a variety of sources (e.g., host device 110A through host device 110N or storage device 106, as shown in FIG. 1) or to receive data from a user, and in some embodiments may utilize processor 202 and/or memory 204 to cause execution of cryptographic algorithms.

In addition, the apparatus 200 further comprises a benchmarking circuitry 210 that observes performance metrics of the execution of cryptographic algorithms. The benchmarking circuitry 210 may utilize processor 202, memory 204, or any other hardware component included in the apparatus 200 to perform these operations, as described in connection with FIGS. 3-4 below. The benchmarking circuitry 210 may further utilize communications hardware 206 to gather data from a variety of sources (e.g., host device 110A through host device 110N or storage device 106, as shown in FIG. 1) or to receive data from a user, and in some embodiments may utilize processor 202 and/or memory 204 to observe performance metrics.

Finally, the apparatus 200 may also comprise one or more cryptographic algorithm circuitry 212A through cryptographic algorithm circuitry 212N that perform core cryptographic operations. The cryptographic algorithm circuitry 212A-212N may communicate directly with driver circuitry 208, with driver circuitry 208 acting as an interface layer to various other circuitry of the apparatus 200. Alternatively, the cryptographic algorithm circuitry 212A-212N may communicate directly with processor 202, memory 204, communications hardware 206, or any other circuitry of apparatus 200.

Although components of FIG. 2 are described in part using functional language, it will be understood that the particular implementations necessarily include the use of particular hardware. It should also be understood that certain of these components of FIG. 2 may include similar or common hardware. For example, the driver circuitry 208, benchmarking circuitry 210, and the cryptographic algorithm circuitry 212A-212N may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the driver circuitry 208, benchmarking circuitry 210, and one or more cryptographic algorithm circuitry 212A-212N may leverage processor 202, memory 204, or communications hardware 206, as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), memory 204, or communications hardware 206 for enabling any functions not performed by special-purpose hardware elements. In all embodiments, however, it will be understood that the driver circuitry 208, benchmarking circuitry 210, and cryptographic algorithm circuitry 212A-212N are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components described above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of graphical user interfaces and flowcharts.

Example Apparatus Operations

Figure 3:
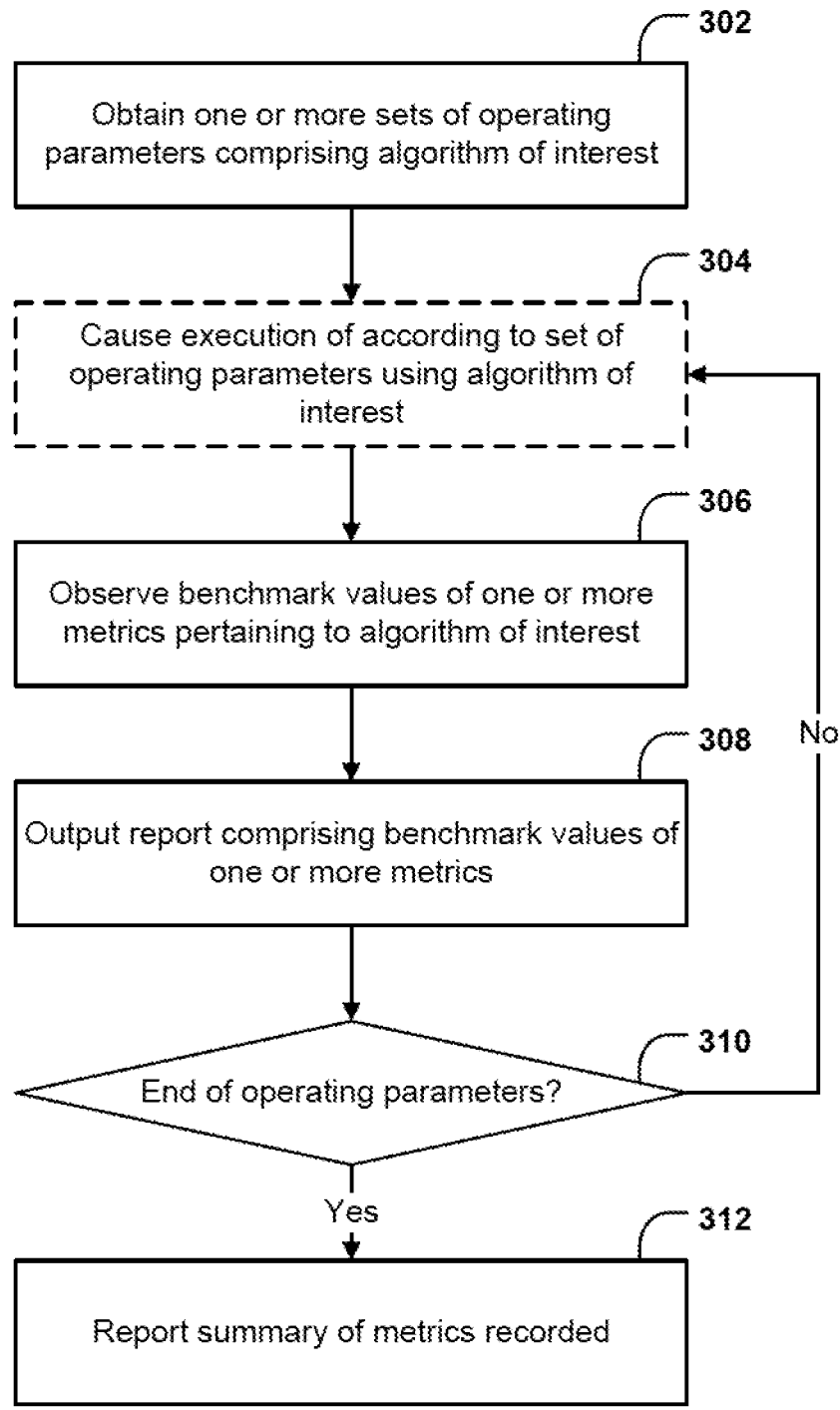
FIG. 3 illustrates an example flowchart for measuring one or more metrics of a cryptographic algorithm in a PQC system, in accordance with some example embodiments described herein.

Turning to FIG. 3, example flowcharts are illustrated that contain example operations implemented by example embodiments described herein. The operations illustrated in FIG. 3 may, for example, be performed by system device 104 of the PQC benchmark system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, driver circuitry 208, benchmarking circuitry 210, cryptographic algorithm circuitry 212A-212N, and/or any combination thereof. It will be understood that user interaction with the PQC benchmark system 102 may occur directly with communications hardware 206, or may instead be facilitated by a separate user device (e.g. user device 112A-112N), as shown in FIG. 1, and which may have similar or equivalent physical componentry facilitating such user interaction.

Turning to FIG. 3, example operations are shown for measuring one or more metrics of a cryptographic algorithm in a post-quantum cryptography (PQC) system.

As shown by operation 302, the apparatus 200 includes means, such as processor 202, memory 204, communications hardware 206, or the like, for obtaining a set of operating parameters comprising an algorithm of interest. In some embodiments, the apparatus 200 may obtain one or more sets of operating parameters comprising the algorithm of interest. The algorithm of interest is a PQC algorithm, a legacy algorithm operating in a hybrid PQC system, or a variant thereof, and the algorithm of interest is wrapped to present, via a wrapped algorithm of interest, a standardized interface to a sequence of benchmark operations. The communications hardware 206 may receive input via one of many input methods, such as a command line interface or a graphical interface, and the user may transmit the set of operating parameters via keyboard, touchscreen, may indicate a file in memory 204 or other storage containing the set of operating parameters, or may utilize other input methods. The processor 202 may interpret the set of operating parameters into a set of instructions for the driver circuitry 208. For example, the communications hardware 206 may receive a set of operating parameters that may indicate the algorithm of interest implementation of Kyber-512, a lattice-based PQC algorithm. The processor 202 may access memory 204 to obtain the location of a cryptographic library implementing Kyber-512 and a wrapped Kyber-512 algorithm. In other examples the algorithm of interest may be a different variant or alternative implementation of Kyber-512, or the algorithm of interest may be a legacy cryptographic algorithm or variant.

In some embodiments, the set of operating parameters may further comprise the sequence of benchmark operations, a payload descriptor specifying a payload of data being secured, and/or a network address specifying a local or remote port where the payload is sent or received. The communications hardware 206 may obtain the sequence of benchmark operations, the payload descriptor, and/or the network address from input. The sequence of benchmark operations may be a selection of benchmark operations from a pre-determined list of benchmark operations, or the sequence of benchmark operations may be in the form of a script or other set of instructions. The payload descriptor may specify properties such as the size, formatting, and content of the cryptographic payload. For example, the payload may be a plaintext file or a binary file, and a plaintext payload may have an encoding such as UTF-8 or UTF-16. The payload descriptor may also specify a location in memory 204 or other storage where a pre-determined cryptographic payload is prepared. The network address may point to a local or remote address where the payload may be sent or received in the course of executing the sequence of benchmark operations. For example, if a user only wants to test local capabilities without factoring in network connectivity, the network address may specify a loopback or local address and port number. If a user benchmarks a PQC system in which network transmission times should be measured, a non-local network address may be specified, for example a host device 110 within the isolated private network 108.

In some embodiments, the sequence of benchmark operations may comprise (i) generating a cryptographic key pair, (ii) encrypting a first message, (iii) decrypting a second message, (iv) signing a third message, (v) verifying a signed fourth message, (vi) transferring a cryptographic payload, or (vii) performing a composite operation integrating one or more of the above benchmark operations. The sequence of benchmark operations may direct the driver circuitry 208 to perform the operations listed above via the wrapped algorithm of interest. For example, the driver circuitry 208 may generate a cryptographic key pair (e.g. a public key and private key). The generated key pair may be used in subsequent operations, for example encrypting/decrypting, encapsulating/decapsulating, signing/verifying, or transferring. The generation of the key pair may optionally depend on parameters such as the key length, a designation of a random seed, or a random number generation procedure.

The sequence of benchmark operations may comprise encrypting or decrypting a message. The encryption or decryption may make use of a pre-determined key, or may make use of a key generated by a previous benchmark operation. The encrypted message may be sent or received via the network address from the set of operating parameters during a transfer benchmark operation. The encryption or decryption may be applied to a payload with the specified payload descriptor, and the payload descriptor may specify the message to be encrypted or decrypted.

In some embodiments, the sequence of benchmark operations may comprise operations for implementing a key establishment scheme. For example, the message to be encrypted or decrypted may comprise a symmetric key, in which the encryption may be a key encapsulation or decapsulation as part of a key encapsulation mechanism (KEM). In another example, public keys may be exchanged as part of a DH key exchange.

The sequence of benchmark operations may comprise signing or verifying a message. The message may be specified by the payload descriptor, and the key used to sign or verify the message may be pre-determined or generated in a benchmark operation. To sign a message, the driver circuitry 208 may cause a conversion of the message to a numerical representation. The driver circuitry 208 may further use the private key and the numerical representation of the message to compute a signature. The signature may be checked by the driver circuitry 208 causing verification of the signed message. The signature value, the public key, and the numerical representation of the message may be used to compute a value that verifies the validity of the signature.

The sequence of benchmark operations may comprise transferring a cryptographic payload, such as a key, encrypted message or cipher text, encapsulated key, signed message, or the like. In some embodiments, the transfer may make use of isolated private network 108 to test the performance of PQC in a network system. Finally, the sequence of benchmark operations may comprise a composite operation integrating one or more of the above. For example, a cryptographic key pair may be generated and encapsulated, then the encapsulated public key transferred to a network address.

In some embodiments, the set of operating parameters may comprise a list of algorithms of interest, and the sequence of benchmark operations may specify a designated algorithm of interest from the list of algorithms of interest to execute each benchmark operation from the sequence of benchmark operations. For example, the sequence of benchmark operations may comprise signing a message and signing the same message a second time, and the operating parameters may specify the first signing utilizes RSA, a legacy cryptographic algorithm, while the second signing utilizes CRYSTALS-DILITHIUM 2, a PQC algorithm. The previous example may be valuable to test the performance of one possible implementation of digitally signing messages in a hybrid PQC system. Similarly, these embodiments may be used to test particular realizations of hybrid PQC encapsulations by performing one encapsulation with a legacy cryptographic algorithm, and another encapsulation with a PQC algorithm.

As shown by operation 304, the apparatus 200 may include means, such as memory 204, communications hardware 206, driver circuitry 208, or the like, for causing execution of the sequence of benchmark operations using the wrapped algorithm of interest. For example, the driver circuitry 208 may cause execution by transmitting commands via communications hardware 206 to a host device 110 where the wrapped algorithm of interest is stored. The host device 110 may perform the transmitted commands to execute the sequence of benchmark operations as directed by the driver circuitry 208. In some embodiments the commands may be executed locally on the apparatus 200. The driver circuitry 208 may verify that the appropriate wrapped algorithm of interest is accessible in memory 204 or other storage, and may direct communications hardware 206 to retrieve the wrapped algorithm of interest from a remote storage if the wrapped algorithm is not accessible. For example, the apparatus 200 may be configured to run in a pre-production, or testing setting, and may cause the execution of the benchmark operations on a system.

In some embodiments, the execution of the sequence of benchmark operations may not be caused by the apparatus 200. For example, the benchmarking circuitry 210 may be configured to run in a production setting, and may observe benchmark values of a system such as isolated private network 108 passively without causing execution of operations.

In some embodiments, the driver circuitry 208 may access the standardized interface of the wrapped algorithm of interest. The driver circuitry 208 may select from among a list of potential wrapped algorithms of interest to access the wrapped algorithm of interest corresponding to the algorithm of interest specified in the set of operating parameters. The driver circuitry 208 may access memory 204 or other storage to retrieve the wrapped algorithm of interest. The wrapped algorithm of interest may be loaded in driver circuitry 208 to allow for execution of the sequence of benchmark operations.

The apparatus 200 may include means, such as cryptographic algorithm circuitry 212A-212N, or the like, for executing functions of the algorithm of interest as directed by the standardized interface. Each of cryptographic algorithm circuitry 212A-212N may be situated locally on the PQC benchmark system 102, or may direct the operations from a host device 110. A particular cryptographic algorithm circuitry (e.g., cryptographic algorithm circuitry 212A) chosen by the driver circuitry 208 may correspond to a particular PQC cryptographic algorithm, legacy cryptographic algorithm, or its variant. The interface of the wrapped algorithm of interest may enable the driver circuitry 208 to direct the operation of the cryptographic algorithm circuitry 212A in a consistent way, such that another cryptographic algorithm circuitry 212B through cryptographic algorithm circuitry 212N could be substituted without any changes needed in the sequence of benchmark operations.

In some embodiments, executing the sequence of benchmark operations utilizes the payload specified by the payload descriptor, and transfer of the payload is directed to or from the network address. The driver circuitry 208 may direct the cryptographic algorithm circuitry 212A to operate on a payload stored in memory 204 or other storage as specified by the payload descriptor. Some benchmark operations may require the use of a network address, either for transferring or receiving a payload or other data. In embodiments where benchmark operations require the use of a network address, the driver circuitry 208 may direct transmissions to the network address specified in the operating parameters. The network address specified in the operating parameters may be one of host device 110A-N, located within the isolated private network 108, or it may be a local (e.g. loopback) address for tests without network connectivity.

As shown by operation 306, the apparatus 200 includes means, such as processor 202, memory 204, benchmarking circuitry 210, or the like, for observing benchmark values of the one or more metrics. The one or more metrics pertain to a designated benchmark operation from the sequence of benchmark operations, and the one or more metrics comprise (i) a duration of time taken to execute the designated benchmark operation, (ii) a duration of time taken to execute a subprocess of the designated benchmark operation, (iii) volatile storage usage due to execution of the designated benchmark operation, (iv) non-volatile storage usage due to execution of the designated benchmark operation, (v) processor usage due to execution of the designated benchmark operation, and/or (vi) a quantity derived from one or more of the above. The benchmarking circuitry 210 may make observations of the driver circuitry 208 directly, or utilize other circuitry in order to observe the one or more metrics. The benchmarking circuitry 210 may observe the duration of time taken to execute the designated benchmark operation by measuring the real elapsed time, or wall time, taken. The benchmarking circuitry 210 may also observe the duration of time taken to execute the designated benchmark operation by measuring only time in which a processor 202 (or other circuitry executing the sequence of benchmark operations) is active, known as central-processing unit (CPU) time. CPU time may also add up time spent processing multiple threads if processor 202 (or other relevant circuitry) is embodied as a multi-core processor. Similarly, the benchmarking circuitry 210 may measure wall time or CPU time for a duration of time taken to execute a subprocess of the designated benchmark operation. For example, the designated benchmark operation may contain subprocesses that are pertinent to cryptography, plus other subprocesses that perform routine tasks, such as file access, reading and writing messages, or the like. A user wishing to measure the performance of the algorithm of interest may only observe metrics of those subprocesses pertinent to cryptography.

The benchmarking circuitry 210 may make observations of the usage of volatile storage, such as the memory 204 or other storage during the designated benchmark operation. For example, the benchmarking circuitry 210 may measure the total usage of random-access memory (RAM), as well as virtual memory, and/or other types of storage embodying memory 204 or storage device 106. The volatile storage usage may be measured in aggregate or at various time intervals, allowing an analysis of the memory usage over time. The benchmarking circuitry 210 may make observations of the usage of non-volatile storage, such as a hard disk or other storage during the designated benchmark operation. For example, the benchmarking circuitry 210 may measure the total usage of disk storage, and/or other types of storage embodying memory 204 or storage device 106. The non-volatile storage usage may be measured in aggregate or at various time intervals, allowing an analysis of the memory usage over time.

The benchmarking circuitry 210 may make observations of the usage of the processor 202 or other circuitry directed to executing the benchmark operation such as driver circuitry 208 or the relevant cryptographic algorithm circuitry 212A-212N. The observations of processor usage may involve the determination of the number of cycles or operations utilized in executing the benchmark operation as a fraction of the total number of cycles or operations within the capacity of the processor. The metric may thus be related to the measurement of CPU time, described above. The processor usage, like memory usage, may be integrated over various time intervals that are subsets of the total execution time to provide a picture of the processor usage over time. Finally, a metric may be derived from one or more of the previously mentioned metrics. For example, a mathematical operation may modify the form of one of the metrics, or may combine two or more metrics to create a different value. For example, processor usage may be presented as a fraction of the maximum processor capacity, as a raw number of operations, or as a number of operations per second by combining processor usage with the elapsed time. In some embodiments, the benchmarking circuitry 210 may observe benchmark values of all of the above metrics.

As shown by operation 308, the apparatus 200 includes means, such as communications hardware 206, or the like, for outputting a report comprising the benchmark values of the one or more recorded metrics. The communications hardware 206 may generate the report by aggregating the benchmark values of the one or more recorded metrics, and presenting them in a human-readable format. For example, benchmark values may be reported as histograms, graphs, pie charts, scatter plots, or other visualizations, and numerical data may be presented in tables, exported in spreadsheets, exported as plaintext, or may be presented via other forms of reporting. The communications hardware 206 may present a final summary report of the executed benchmark operations, or may maintain a real-time report, presenting information to the user as the benchmark operations execute and continuously updating the reported benchmark values. The communications hardware 206 may present the report by use of any attached output device such as a monitor, printer, or the like, and may utilize a graphical user interface (GUI) to display the report interactively to the user.

In some embodiments, the communications hardware 206 may obtain additional sets of operating parameters, and the apparatus 200 may perform operation 304 through operation 308 repeatedly over the various additional sets of operating parameters. As shown in operation 310, the repeated execution of operation 304 through operation 308 may continue until the last set of operating parameters is reached. As shown in operation 312, the apparatus 200 may include means, such as communications hardware 206, or the like, for outputting a summary of the reports of the benchmark values of the metrics observed during the repetitions of the method. The summary may comprise an evaluation and a comparison of the benchmark values of the one or more metrics of the algorithm of interest operating in conditions specified by the sets of operating parameters. The communications hardware 206 may output the summary of reports in a format similar to the report described in connection with operation 308, making use of various charts, text outputs, tables, and/or a GUI. The communications hardware 206 may aggregate information from a plurality of reports comprising benchmark values to generate the summary. The summary may utilize the information in the plurality of reports to draw comparisons between algorithms of interest, such as by ranking or scoring the performance of algorithms of interest on one or more factors. For example, the summary may rank two or more algorithms of interest in terms of their total elapsed time to encrypt a plaintext message as well as their maximum memory usage during the encryption operation.

For example, the operating parameters and the additional operating parameters may indicate that two different implementations of a PQC algorithm are to be compared. The first implementation may come from a vendor, and the second implementation may use open-source software. In this example, the cause repeated execution of the benchmark operations and observe the benchmark values for each repetition of the benchmark operations. The communications hardware 206 may output a summary report producing a comparison of the two implementations of the PQC algorithm. The summary report may, for example, compare the signing speed for a digital signature operation, or the resource usage of the two implementations of the PQC algorithms for digital signatures.

In some embodiments, the benchmarking circuitry 210 may compute one or more benchmark scores, wherein the benchmark scores are derived from the one or more metrics and reflect overall performance of the algorithm of interest in a system. The benchmarking circuitry 210 may obtain as input the benchmark values observed in connection with operation 306. The benchmarking circuitry 210 may perform a calculation using the input benchmark values to derive the numerical benchmark score. The benchmark score may depend on one or more of the benchmark values, and may be computed by applying various weights to the benchmark values depending on their importance to the system being tested. The benchmark score may provide a single user-readable value, allowing convenient ordering of the algorithm of interest in comparison with other algorithms of interest based on the benchmark score, and simplifying interpretation of the benchmark values for a broader range of individuals who may have varying levels of technical sophistication. For example, the benchmarking circuitry 210 may be configured to operate in a post-production environment and make a report summarizing the performance of the algorithm of interest, proposing optimizations or changes to the PQC system.

In some embodiments, the benchmarking circuitry 210 may obtain the benchmark values from a separate host device 110. The benchmarking circuitry 210 may make calls to the operating system or other circuitry on host device 110 to obtain benchmark values in the case that the apparatus 200 causes execution of the sequence of benchmark operations on a remote device (e.g., host device 110). The benchmarking circuitry 210 may access storage of host device 110 to retrieve logs or other data from which benchmark values are derived. In some embodiments, an agent may be installed on the host device 110 that forwards test results to the benchmarking circuitry 210 of the apparatus 200.

In some embodiments, the benchmarking circuitry 210 may autonomously select a cryptographic algorithm for deployment in the PQC system based on the benchmark values reported. The selection by the benchmarking circuitry 210 may be based on a function which uses the benchmark values as inputs, and makes a selection based on attributes of the PQC system in which the cryptographic algorithm is to be deployed. This function may be defined based on rules extracted from user preference. For instance, a user may predefine preferences regarding differential importance of various attributes of the PQC system, and those rules and/or preferences may be converted by the benchmarking circuitry 210 into a decision tree or other set of rules that guide the autonomous selection of the cryptographic algorithm. The benchmarking circuitry 210 may utilize benchmarking scores or other aggregate comparisons of the algorithms of interest to make the selection. The communications hardware 206 may report the selected cryptographic algorithm, and may transfer a reference to the selected algorithm to another system for further use in a cryptographic system. For example, the benchmarking circuitry 210 may be configured to operate in a post-production environment and make a report summarizing the performance of the algorithm of interest, proposing optimizations or changes to the PQC system.

In some embodiments, the autonomous selection of the cryptographic algorithm for deployment in the PQC system may include preparing a report for migration planning. The report may summarize relevant benchmark values. The report may draw comparisons between the user's predefined preferences and attributes of the PQC system, for example, highlighting values that fall outside of user preference bounds. The report for migration planning may also list software requirements for migration, such as libraries or packages to install, technical or hardware requirements for installation, and/or instructions for installing and migrating the recommended cryptographic algorithm.

In some embodiments, the autonomous selection of the cryptographic algorithm for deployment in the PQC system may make the selection information available to a device such as one of host device 110A-110N or user device 112-112N. The selection information may be made available via an application programming interface (API), registry, and/or other means. The device receiving the selection information may integrate into a larger system, such as a governance system or risk compliance system that may utilize the selection information to make or inform decisions.

In some embodiments, the autonomous selection of the cryptographic algorithm for deployment in the PQC system may further automatically perform software updates to modify, remove, and/or install various cryptographic algorithms. For example, the communications hardware 206 may provide a command to devices on the isolated private network 108 such as one of host device 110A-110N. The command may cause the receiving device to take action to implement the recommendations of the autonomous selection of the cryptographic algorithm by removing or modifying a previous installation of a cryptographic algorithm and/or installing a newly recommended cryptographic algorithm. The installation, modification, and/or removal may also apply to various supporting libraries and/or packages related to the recommended cryptographic algorithms.

Example System Operations

Figure 4:
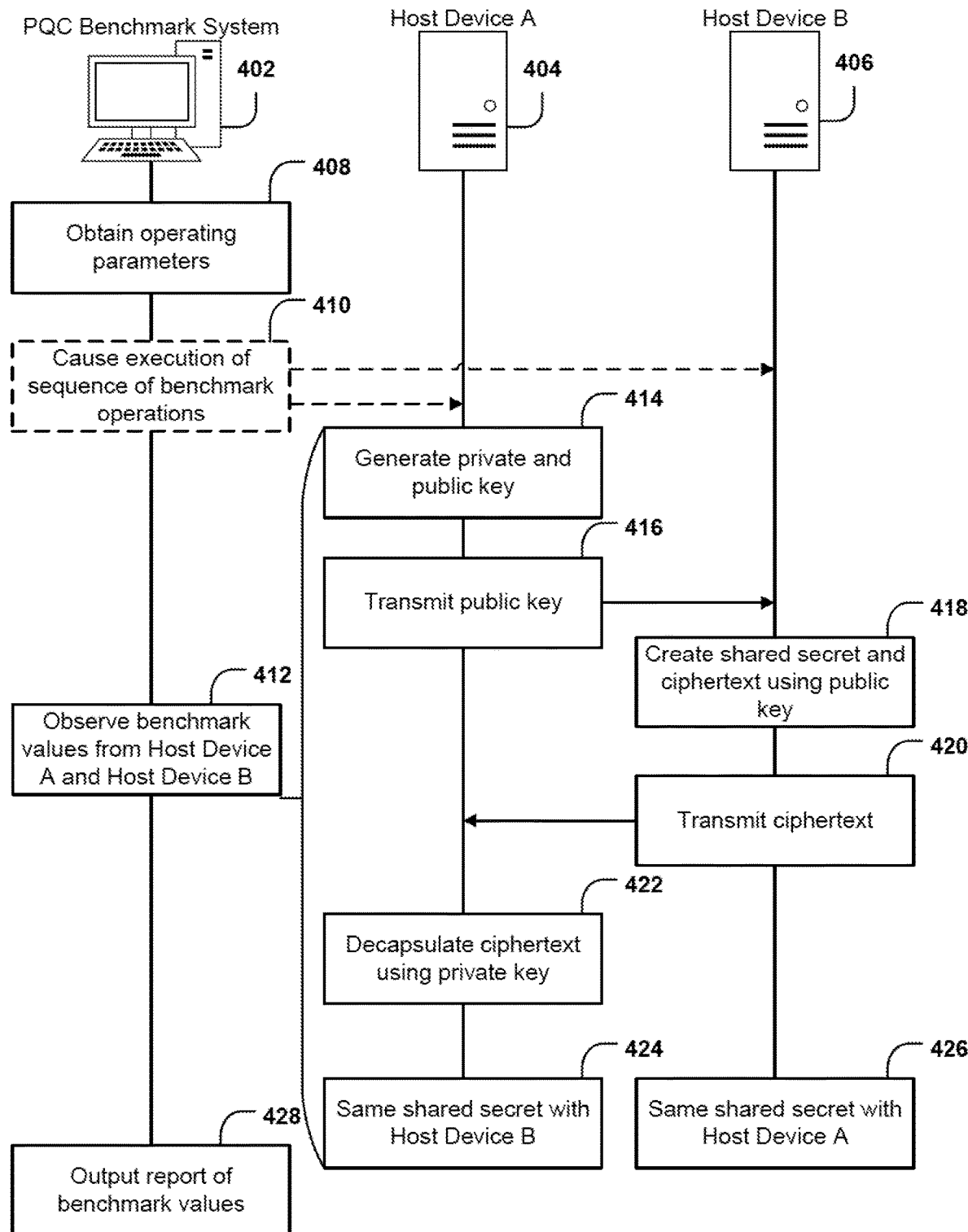
FIG. 4 illustrates a swim lane diagram of operations for measuring one or more metrics of a cryptographic algorithm in a PQC system, in accordance with some example embodiments described herein.
Figure 5:
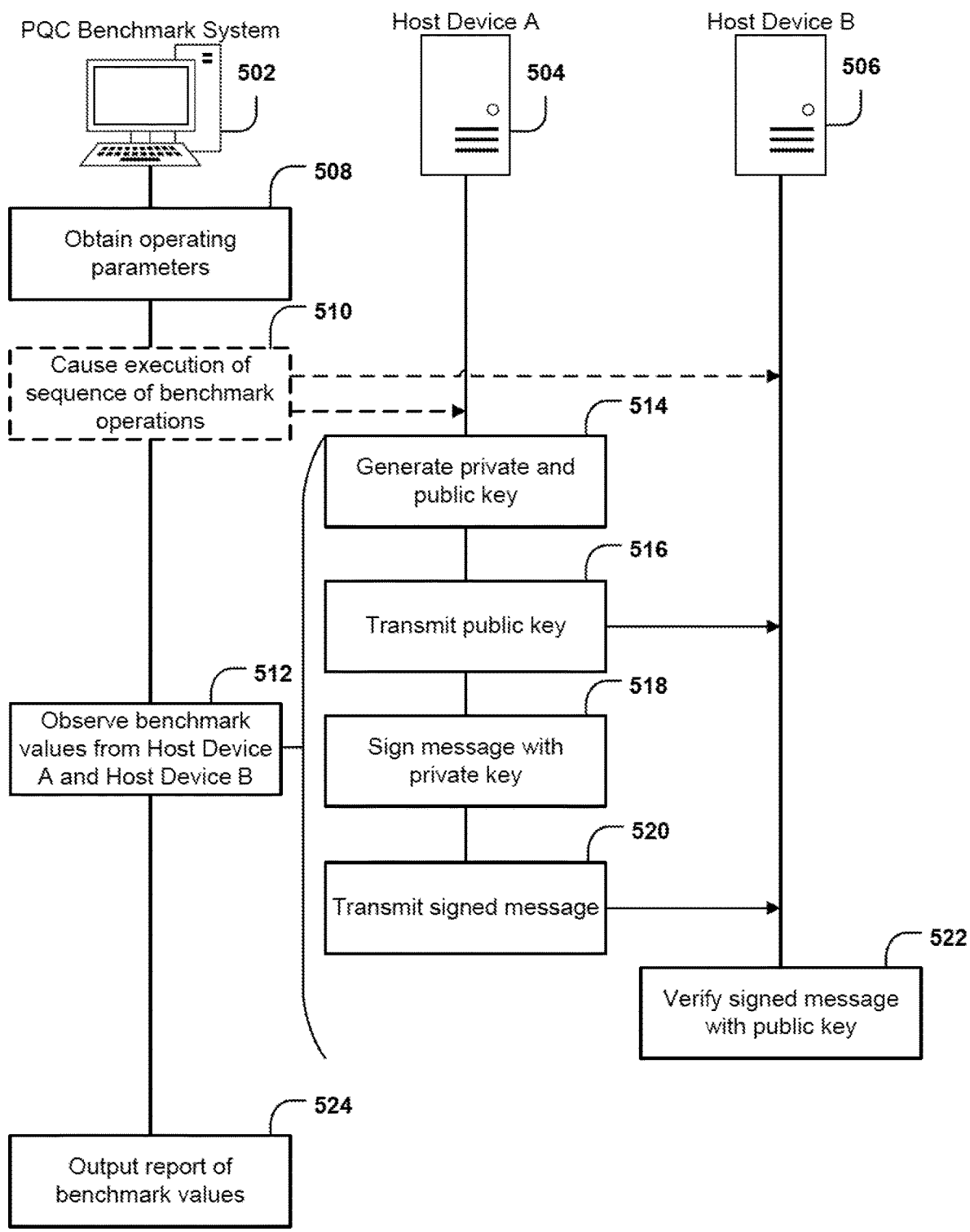
FIG. 5 illustrates a swim lane diagram of operations for measuring one or more metrics of a cryptographic algorithm in a PQC system, in accordance with some example embodiments described herein.

FIGS. 4-5 show swim lane diagrams illustrating example operations (e.g., as described above in connection with FIG. 3) performed by components of the environment depicted in FIG. 1 to produce various benefits from example embodiments. In these figures, operations performed by a PQC benchmark system 102 are shown along the vertical line extending from the element labeled "PQC benchmark system 402" and "PQC benchmark system 502," operations performed by a host device 110A are shown along the vertical line extending from the element labeled "host device A 404" and "host device A 504" and operations performed by a host device 110B are shown along the vertical line extending from the element labeled "host device B 406" and "host device B 506." Operations impacting two devices, such as data transmissions between the devices, are shown using arrows extending between these lines. Generally, the operations are ordered temporally with respect to one another. However, it will be appreciated that the operations may be performed in other orders from those illustrated herein.

It will be understood that the operations of FIGS. 4-5 represent example embodiments, and the sequence of benchmark operations, given at operation 414 through operation 422, and operation 514 through operation 522, represent example sequences of benchmark operations from example sets of operating parameters. For example, the system depicted in FIG. 4 may, if presented with a different example set of operating parameters, execute sequence of benchmark operations distinct from operation 414 through operation 422, execute the same operations in a different order, or demonstrate other behavior according to the example set of operating parameters and sequence of benchmark operations provided.

Turning to FIG. 4, at operation 408, the PQC benchmark system 402 may obtain a set of operating parameters. At operation 410, the PQC benchmark system 402 may interpret the set of operating parameters to cause execution of an example sequence of benchmark operations on host device A 404 and host device B 406. The example sequence of benchmark operations is shown in operations 414 through 422 of host device A 404 and host device B 406. After causing execution of the example sequence of benchmark operations, the PQC benchmark system 402 in operation 412 may observe benchmark values of the one or more metrics of the example sequence of benchmark operations, shown in operations 414 through 422.

At operation 414, the host device A 404 may generate a private and public key pair. At operation 416, the host device A 404 may transmit the public key from the private and public key pair to host device B 406. At operation 418, the host device B 406 may use the public key received from host device A 404 to generate a shared secret and a ciphertext. At operation 420, the host device B 406 may transmit the ciphertext to host device A 404. At operation 422, the host device A 404 may decapsulate the ciphertext using the private key generated at operation 414. In some embodiments, the host device A 404 may further verify the integrity of operations 414 through 422 by transmitting a message encrypted with the shared secret to host device B 406, receiving a decrypted plaintext, and comparing the decrypted plaintext to the original message. At operation 424 and operation 426, host device A and host device B may validate that they possess the same shared secret.

At operation 428, the PQC benchmark system 402 may output a report of the benchmark values of the one or more metrics observed at operation 412.

Turning to FIG. 5, at operation 508, the PQC benchmark system 502 may obtain a set of operating parameters. At operation 510, the PQC benchmark system 502 may interpret the set of operating parameters to cause execution of an example sequence of benchmark operations on host device A 504 and host device B 506. The example sequence of benchmark operations is shown in operations 514 through 522 of host device A 504 and host device B 506. After causing execution of the example sequence of benchmark operations, the PQC benchmark system 502 in operation 512 may observe benchmark values of the one or more metrics of the example sequence of benchmark operations, shown in operations 514 through 522.

At operation 514, the host device A 504 may generate a private and public key pair. At operation 516, the host device A 504 may transmit the public key from the private and public key pair to host device B 506. At operation 518, the host device A 504 may digitally sign a message using the private key from the key pair. At operation 520, the host device A 506 may transmit the digitally signed message to host device B 506. At operation 522, the host device B 506 may verify the digital signature of the digitally signed message received at operation 520, using the public key received at operation 516.

At operation 524, the PQC benchmark system 502 may output a report of the benchmark values of the one or more metrics observed at operation 512.

As described above, example embodiments provide methods and apparatuses that provide benchmarking in PQC systems, enabling upgrades to the security of legacy systems. Example embodiments thus provide tools that enable efficient transition from legacy systems to PQC systems, which is necessary to protect against a future quantum computer attack. Finally, by automating the testing and measurement of benchmarks, example embodiments enable computer network systems to adapt and respond to quantum-enabled threats without slow and costly human intervention to test each potential PQC or hybrid solution.

As these examples all illustrate, example embodiments contemplated herein provide technical solutions that solve real-world problems faced during administration of secure systems on a network. While the implementation and administration of secure cryptography systems has long been a difficult problem, the looming threat of a quantum computer attack, or a "harvest now and decrypt later attack." raises the immediate need for a rapid implementation of PQC secure systems. To meet this challenge, a broad range of PQC solutions have been devised, making it difficult for administrators of secure networks to evaluate the most appropriate algorithm for each particular use case. The automatic benchmarking of PQC algorithms presented in example embodiments described herein thus represents a technical solution to these real-world problems.

FIGS. 3-4 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for measuring one or more metrics of a cryptographic algorithm in a post-quantum cryptography (PQC) system, the method comprising:

obtaining, via communications hardware, a set of operating parameters comprising an algorithm of interest, wherein the algorithm of interest is a PQC algorithm or a legacy cryptographic algorithm operating in a hybrid PQC system, and wherein the algorithm of interest is wrapped to present, via a wrapped algorithm of interest, a standardized interface to a sequence of benchmark operations;

observing, via a benchmarking circuitry interfaced to an isolated private network, benchmark values of the one or more metrics for a designated benchmark operation from an execution of the sequence of benchmark operations, wherein the designated benchmark operation is performed in the isolated private network, wherein the one or more metrics comprise:

a first duration of time taken to execute the designated benchmark operation, a second duration of time taken to execute a subprocess of the designated benchmark operation, volatile storage usage due to the execution of the designated benchmark operation, non-volatile storage usage due to the execution of the designated benchmark operation, processor usage due to the execution of the designated benchmark operation, or a quantity derived from one or more of the above metrics; and outputting, via the communications hardware, a report comprising the benchmark values of the one or more metrics.

2. The method of claim 1, wherein the set of operating parameters further comprises:

the sequence of benchmark operations;

a payload descriptor specifying a payload of data being secured; and a network address specifying a local or remote port where the payload is sent or received;

wherein the execution of the sequence of benchmark operations utilizes the payload specified by the payload descriptor, and wherein transfer of the payload is directed to or from the network address.

3. The method of claim 1, wherein the sequence of benchmark operations comprises:

generating a cryptographic key pair;

encrypting a first message;

decrypting a second message;

signing a third message;

verifying a signed fourth message;

transferring a cryptographic payload; or performing a composite operation integrating one or more of the above.

4. The method of claim 1, wherein the sequence of benchmark operations comprises operations for implementing a key establishment scheme.

5. The method of claim 1, wherein the set of operating parameters comprises a list of algorithms of interest, and wherein the sequence of benchmark operations specifies a designated algorithm of interest from the list of algorithms of interest executing each benchmark operation from the sequence of benchmark operations.

6. The method of claim 1, further comprising:

causing the execution, via a driver circuitry, of the sequence of benchmark operations using the wrapped algorithm of interest.

7. The method of claim 6, further comprising:

obtaining, via the communications hardware, additional sets of operating parameters comprising additional algorithms of interest wrapped to present, via additional wrapped algorithms of interest, standardized interfaces to the sequence of benchmark operations;

causing the execution, via the driver circuitry, of the sequence of benchmark operations using the additional wrapped algorithms of interest;

observing, via the benchmarking circuitry, additional benchmark values of the one or more metrics for the designated benchmark operation from execution of the sequence of benchmark operations using the additional wrapped algorithms of interest; and outputting, via the communications hardware, a summary of reports of the benchmark values and the additional benchmark values, wherein the summary comprises an evaluation and a comparison of the benchmark values and the additional benchmark values.

8. The method of claim 6, wherein:

the driver circuitry causes execution of the sequence of benchmark operations on a separate host device; and the benchmarking circuitry observes the benchmark values by receiving the benchmark values from the separate host device.

9. The method of claim 6, wherein causing execution of the sequence of benchmark operations comprises:

accessing, via the driver circuitry, the standardized interface of the wrapped algorithm of interest; and causing execution, via cryptographic algorithm circuitry, of functions of the algorithm of interest as directed by the standardized interface.

10. The method of claim 1, further comprising:

computing, via the benchmarking circuitry, one or more benchmark scores, wherein the one or more benchmark scores are derived from the one or more metrics and reflect overall performance of the algorithm of interest in a system.

11. The method of claim 1, further comprising:

selecting, via the benchmarking circuitry, the cryptographic algorithm for deployment in the PQC system based on the benchmark values reported.

12. An apparatus for measuring one or more metrics of a cryptographic algorithm in a post-quantum cryptography (PQC) system, the apparatus comprising:
communications hardware configured to:
obtain a set of operating parameters comprising an algorithm of interest, wherein the algorithm of interest is a PQC algorithm or a legacy cryptographic algorithm operating in a hybrid PQC system, and wherein the algorithm of interest is wrapped to present, via a wrapped algorithm of interest, a standardized interface to a sequence of benchmark operations; and
a benchmarking circuitry, interfaced to an isolated private network and configured to:
observe benchmark values of the one or more metrics for a designated benchmark operation from an execution of the sequence of benchmark operations, wherein the designated benchmark operation is performed in the isolated private network, and wherein the one or more metrics comprise:
a first duration of time taken to execute the designated benchmark operation,
a second duration of time taken to execute a sub-process of the designated benchmark operation,
volatile storage usage due to the execution of the designated benchmark operation,
non-volatile storage usage due to the execution of the designated benchmark operation,
processor usage due to the execution of the designated benchmark operation, or
a quantity derived from one or more of the above metrics; and
wherein the communications hardware is further configured to:
output a report comprising the benchmark values of the one or more metrics.

13. The apparatus of claim 12, wherein the set of operating parameters further comprises:
the sequence of benchmark operations;
a payload descriptor specifying a payload of data being secured; and
a network address specifying a local or remote port where the payload is sent or received;
wherein execution of the sequence of benchmark operations utilizes the payload specified by the payload descriptor, and wherein transfer of the payload is directed to or from the network address.

14. The apparatus of claim 12, wherein the sequence of benchmark operations comprises:
generating a cryptographic key pair;
encrypting a first message;
decrypting a second message;
signing a third message;
verifying a signed fourth message;
transferring a cryptographic payload; or
performing a composite operation integrating one or more of the above.

15. The apparatus of claim 12, wherein the set of operating parameters comprises a list of algorithms of interest, and wherein the sequence of benchmark operations specifies a designated algorithm of interest from the list of algorithms of interest executing each benchmark operation from the sequence of benchmark operations.

16. The apparatus of claim 12, further comprising:
a driver circuitry configured to:
cause execution of the sequence of benchmark operations using the wrapped algorithm of interest.

17. The apparatus of claim 16,
wherein the communications hardware is further configured to:
obtain additional sets of operating parameters comprising additional algorithms of interest wrapped to present, via additional wrapped algorithms of interest, standardized interfaces to the sequence of benchmark operations;
wherein the driver circuitry is further configured to:
cause execution of the sequence of benchmark operations using the additional wrapped algorithms of interest;
wherein the benchmarking circuitry is further configured to:
observe additional benchmark values of the one or more metrics for the designated benchmark operation from execution of the sequence of benchmark operations using the additional wrapped algorithms of interest; and
wherein the communications hardware is further configured to:
output a summary of reports of the benchmark values and the additional benchmark values, wherein the summary comprises an evaluation and a comparison of the benchmark values and the additional benchmark values.

18. The apparatus of claim 16, wherein:
the driver circuitry is configured to cause execution of the sequence of benchmark operations on a separate host device; and
the benchmarking circuitry is configured to observes the benchmark values by receiving the benchmark values from the separate host device.

19. The apparatus of claim 16,
wherein the driver circuitry is configured to cause execution of the sequence of benchmark operations by accessing the standardized interface of the wrapped algorithm of interest; and
wherein the apparatus further comprises cryptographic algorithm circuitry configured to execute functions of the algorithm of interest as directed by the standardized interface.

20. The apparatus of claim 12, wherein the benchmarking circuitry is further configured to:
compute one or more benchmark scores, wherein the one or more benchmark scores are derived from the one or more metrics and reflect overall performance of the algorithm of interest in a system.

* * * * *